US012662592B2

(12) United States Patent
Tynys et al.

(10) Patent No.: US 12,662,592 B2
(45) Date of Patent: Jun. 23, 2026

(54) POLYPROPYLENE COMPOSITION FOR HMS PP FOAM SHEET WITH BALANCED BENDING RESISTANCE

(71) Applicant: BOREALIS AG, Vienna (AT)

(72) Inventors: Antti Tynys, Linz (AT); Norbert Reichelt, Linz (AT); Yi An Lin, New Taipei (CN)

(73) Assignee: BOREALIS AG, Vienna (AT)

( * ) Notice: Subject to any disclaimer, the term of this patent is extended or adjusted under 35 U.S.C. 154(b) by 605 days.

(21) Appl. No.: 18/002,069

(22) PCT Filed: Jun. 24, 2021

(86) PCT No.: PCT/EP2021/067321
§ 371 (c)(1),
(2) Date: Dec. 16, 2022

(87) PCT Pub. No.: WO2021/260097
PCT Pub. Date: Dec. 30, 2021

(65) Prior Publication Data

US 2023/0227640 A1 Jul. 20, 2023

(30) Foreign Application Priority Data

Jun. 26, 2020 (EP) .................................... 20182505

(51) Int. Cl.

| | |
|---|---|
| ***C08L 23/12*** | (2006.01) |
| ***B32B 27/06*** | (2006.01) |
| ***B32B 27/32*** | (2006.01) |
| ***C08J 5/18*** | (2006.01) |
| ***C08J 9/00*** | (2006.01) |
| ***C08J 9/14*** | (2006.01) |
| ***C08K 3/34*** | (2006.01) |

(52) U.S. Cl.
CPC ............ *C08L 23/12* (2013.01); *B32B 27/065* (2013.01); *B32B 27/32* (2013.01); *C08J 5/18* (2013.01); *C08J 9/0061* (2013.01); *C08J 9/0066* (2013.01); *C08J 9/141* (2013.01); *C08K 3/34* (2013.01); *B32B 2266/025* (2013.01); *B32B 2270/00* (2013.01); *B32B 2272/00* (2013.01); *B32B 2307/304* (2013.01); *B32B 2307/546* (2013.01); *B32B 2307/72* (2013.01); *C08J 2201/03* (2013.01); *C08J 2203/14* (2013.01); *C08J 2203/16* (2013.01); *C08J 2323/12* (2013.01); *C08J 2323/14* (2013.01); *C08J 2400/30* (2013.01); *C08J 2423/12* (2013.01); *C08L 2203/14* (2013.01); *C08L 2205/025* (2013.01); *C08L 2205/24* (2013.01); *C08L 2207/20* (2013.01)

(58) Field of Classification Search
None
See application file for complete search history.

(56) References Cited

U.S. PATENT DOCUMENTS

| | | | |
|---|---|---|---|
| 6,224,954 B1 | 5/2001 | Mitchell et al. | |
| 6,946,495 B2 | 9/2005 | Zwynenburg et al. | |
| 2005/0165165 A1* | 7/2005 | Zwynenburg .......... | C08J 9/0061 525/88 |
| 2013/0052385 A1 | 2/2013 | Leser et al. | |
| 2015/0051302 A1* | 2/2015 | Leser ......................... | C08J 9/08 521/91 |
| 2015/0133590 A1* | 5/2015 | Klimke .................... | C08K 5/11 524/151 |
| 2018/0201752 A1* | 7/2018 | Lin ......................... | B32B 27/32 |
| 2018/0298174 A1* | 10/2018 | Reichelt ................ | C08F 299/00 |

FOREIGN PATENT DOCUMENTS

| | | |
|---|---|---|
| CN | 105592997 A | 5/2016 |
| DE | 3539352 A1 | 5/1986 |
| EP | 0316187 A2 | 11/1989 |
| EP | 0879830 A1 | 11/1998 |
| EP | 0890612 A2 | 1/1999 |
| EP | 0787750 B1 | 5/2003 |
| EP | 1892264 A1 | 2/2008 |
| RU | 2708857 C2 | 8/2019 |

(Continued)

OTHER PUBLICATIONS

Applicant: Borealis AG; Polyproplene Composition for HMS PP Foam Sheet with Balanced Bending Resistance; International Application No. PCT/EP2021/067321; PCT International Search Report and Written Opinion; dated Sep. 14, 2021; 12 pgs.

Applicant: Borealis AG; Polyproplene Composition for HMS PP Foam Sheet with Balanced Bending Resistance; European Application No. EP20182505; PCT Extended European Search Report; dated Nov. 17, 2020; 6 pgs.

Naguib, H. E., Park, C. B., & Reichelt, N. (2003). Fundamental foaming mechanisms governing the volume expansion of extruded polypropylene foams. Journal of Applied Polymer Science, 91(4), 2661-2668. doi: 10.1002/app.13448.

(Continued)

*Primary Examiner* — Eli D. Strah

(74) *Attorney, Agent, or Firm* — Tarolli, Sundheim, Covell & Tummino LLP

(57) ABSTRACT

The present invention relates to a polypropylene composition comprising —10 to 50 wt. % of recycled polypropylene (R-PP) and/or linear polypropylene (L-PP); —40 to 89.95 wt. % of a high melt strength polypropylene (HMS-PP) having an F30 melt strength of more than 25.0 cN and a v30 melt extensibility of more than 205 mm/s, wherein the F30 melt strength and the v30 melt extensibility are determined according to ISO 16790:2005; and —0.05 to 10 wt. % of a nucleating agent (NA); a foamed sheet formed from the polypropylene composition; an article comprising the foamed sheet and a process comprising the step of forming the polypropylene composition. Furthermore, the invention is further directed to the usage of the polypropylene composition for the formation of foamed sheets.

13 Claims, No Drawings

(56) References Cited

FOREIGN PATENT DOCUMENTS

| | | | |
|---|---|---|---|
| TW | M463649 | U | 10/2013 |
| WO | 199924479 | A1 | 5/1999 |
| WO | 2010/076701 | A1 | 7/2010 |
| WO | 2011/036272 | A2 | 3/2011 |

OTHER PUBLICATIONS

Blomenhofer, M., et al. (2005). "Designer" Nucleating Agents for Polypropylene. Macromolecules, 38(9), 3688-3695. doi:10.1021/ma0473317.
Rheotens-Mastercurves and Drawability of Polymer Melts, M. H. Wagner, Polymer Engineering and Sience, vol. 36, pp. 925 to 935, 1996.
Lee, S. T. "Foam Extrusion Principles and Practice, Chap. 4." ST Iee. eds., Technomic Publishing Co (2000): 81-124.
Chinese Application No. 202180043779.3, Office Action dated Oct. 25, 2023.
Russian Application No. 2022128227/04, Office Action dated Jun. 9, 2023.
Russian Application No. 2022128227/04 Search Report.
United Arab Emirates Application No. P6002723/2022, Office Action dated Aug. 1, 2024.
Indian Application No. 202317004467, Office Action dated Jan. 8, 2026.

* cited by examiner

POLYPROPYLENE COMPOSITION FOR HMS PP FOAM SHEET WITH BALANCED BENDING RESISTANCE

SUMMARY OF THE INVENTION

The present invention relates to a polypropylene composition suitable for foamed sheets, a foamed sheet made from the composition and an article made from the foamed sheet. The present invention is further directed to a process for preparing the polypropylene composition and the use of the polypropylene composition.

BACKGROUND OF THE INVENTION

Currently LDPE coated carton and foamed PS are predominantly used materials in disposable single use hot & cold beverage cups. Due to health concerns and negative environmental effect of the foamed PS cups, the polystyrene cups are banned or about to be banned in many countries and/or cities. Therefore, the PE coated carton is getting more popular and replacing the PS in the hot & cold beverage cups. However, due to the LDPE coating, the paper cups are not compostable and recycling is cumbersome due to difficult and expensive separation process of the pulp and PE coating. Thus, from recyclability and an environmental point of view, a paper cup in not an ideal solution.

Therefore, the only feasible way to dispose paper cups is either energy recovery by incineration or dumping the used cups to a landfill. In addition to the environmental issues of the paper cups, the challenge has been the unbalanced property profile, especially the difference of the bending resistance in machine direction and transverse direction, of the paper sheet which is used in the paper cup production. In addition to the afore-mentioned issues of the paper cups, the challenge has been to have an excellent insulation performance, especially at elevated temperatures for hot beverage cups. Therefore, the objective of the recent development has been to develop a disposable, recyclable material inter alia suitable for single use hot & cold beverage cups which overcomes the above problems.

Therefore, the present invention provides a polypropylene composition comprising

- 10.0 to 50.0 wt. % of recycled polypropylene (R-PP) and/or linear polypropylene (L-PP);
- 40.0 to 89.95 wt. % of a high melt strength polypropylene (HMS-PP) having an $F_{30}$ melt strength of more than 25.0 cN and a $v_{30}$ melt extensibility of more than 205 mm/s, wherein the $F_{30}$ melt strength and the $v_{30}$ melt extensibility are determined according to ISO 16790: 2005; and
- 0.05 to 10.0 wt. % of a nucleating agent (NA).

The polypropylene composition according to the present invention surprisingly has a high bending resistance in both machine and transverse direction when formed into foams. Furthermore, contrary to LDPE-coated carton the thermal conductivity does not increase with increasing temperature. Thus, the polypropylene composition according to the present invention is particularly suitable for forming cups.

A linear polypropylene according to the present invention does not cover side chains.

High Melt Strength Polypropylene (HMS-PP)

A high melt strength polypropylene is branched and, thus, differs from a linear polypropylene in that the polypropylene backbone covers side chains whereas a non-branched polypropylene, i.e. a linear polypropylene, does not cover side chains. The side chains have significant impact on the rheology of the polypropylene. Accordingly, linear polypropylenes and high melt strength polypropylenes can be clearly distinguished by their flow behavior under stress.

Branching can be generally achieved by using specific catalysts, i.e. specific single-site catalysts, or by chemical modification. Concerning the preparation of a branched polypropylene obtained by the use of a specific catalyst reference is made to EP 1 892 264. With regard to a branched polypropylene obtained by chemical modification it is referred to EP 0 879 830 A1. In such a case the branched polypropylene is also called high melt strength polypropylene. The high melt strength polypropylene (HMS-PP) according to the instant invention is obtained by chemical modification of a polypropylene (PP) as described in more detail below. HMS-PP is commercially available from Borealis AG under the trade name Daploy™.

Therefore the high melt strength polypropylene (HMS-PP) has an $F_{30}$ melt strength of more than 25.0 cN and a $v_{30}$ melt extensibility of more than 205 mm/s, preferably has an $F_{30}$ melt strength of more than 25.0 to 50.0 cN and a $v_{30}$ melt extensibility of more than 205 to 300 mm/s, in order to provide a resulting polypropylene composition with good shear thinning properties. The $F_{30}$ melt strength and the $v_{30}$ melt extensibility are measured according to ISO 16790: 2005.

In a preferred embodiment, the high melt strength polypropylene (HMS-PP), has (a) an $F_{30}$ melt strength of more than 25.0 to 45.0 cN, preferably more than 25.0 to 42.0 cN and most preferably more than 25.0 cN to 40.0 cN;

and (b) a $v_{30}$ melt extensibility of 210 to 300 mm/s, more preferably of 215 to 290 mm/s, even more preferably 220 to 270 mm/s and most preferably 225 to 260 mm/s.

In an especially preferred embodiment the high melt strength polypropylene (HMS-PP) has an $F_{30}$ melt strength of more than 25.0 to 45.0 cN and $v_{30}$ melt extensibility of 210 to 300 mm/s, like an $F_{30}$ melt strength of more than 25.0 to 42.0 cN and $v_{30}$ melt extensibility of 215 to 290 mm/s or an $F_{30}$ melt strength of more than 25.0 to 40.0 cN and $v_{30}$ melt extensibility of 220 to 270 mm/s or an $F_{30}$ melt strength of more than 25.0 to 40.0 cN and $v_{30}$ melt extensibility of 225 to 260 mm/s.

Further it is preferred that the high melt strength polypropylene (HMS-PP), has a melt flow rate $MFR_2$ (230° C.) measured according to ISO 1133 of not more than 15.0 g/10 min, more preferably in a range of 0.5 to 15.0 g/10 min, yet more preferably in a range of 1.0 to 15.0 g/10 min, like in the range of 1.5 to 15.0 g/10 min.

In a particularly preferred embodiment the high melt strength polypropylene (HMS-PP), has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Hence in one specific embodiment, the high melt strength polypropylene (HMS-PP), has (a) a melt flow rate $MFR_2$ (230° C.) not more than 15.0 g/10 min, more preferably in a range of 0.5 to 15.0 g/10 min, yet more preferably in a range of 1.0 to 15.0 g/10 min, like in the range of 1.5 to 15.0 g/10 min; and (b) an $F_{30}$ melt strength of more than 25.0 cN, preferably more than 25.0 to 50.0 cN, more preferably more than 25.0 to 45.0 cN, even more preferably more than 25.0 to 42.0 cN and most preferably more than 25.0 cN to 40.0 cN; and (c) a $v_{30}$ melt extensibility of more than 205 mm/s, preferably more than 205 to 300 mm/s, more preferably 210 to 300 mm/s, even more preferably of 215 to 290 mm/s, still more preferably 220 to 270 mm/s and most preferably 225 to 260 mm/s.

In a particularly preferred embodiment, the high melt strength polypropylene (HMS-PP), has (a) a melt flow rate $MFR_2$ (230° C.) not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min; and (b) an $F_{30}$ melt strength of more than 25.0 cN, preferably more than 25.0 to 50.0 cN, more preferably more than 25.0 to 45.0 cN, even more preferably more than 25.0 to 42.0 cN and most preferably more than 25.0 cN to 40.0 cN; and (c) a $v_{30}$ melt extensibility of more than 205 mm/s, preferably more than 205 to 300 mm/s, more preferably 210 to 300 mm/s, even more preferably of 215 to 290 mm/s, still more preferably 220 to 270 mm/s and most preferably 225 to 260 mm/s.

Accordingly in a specific embodiment the high melt strength polypropylene (HMS-PP), has a melt flow rate $MFR_2$ (230° C.) in a range of 0.5 to 15.0 g/10 min, an $F_{30}$ melt strength of more than 25.0 to 45.0 cN and $v_{30}$ melt extensibility of 210 to 300 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.5 to 15.0 g/10 min, an $F_{30}$ melt strength of more than 25.0 to 40.0 cN and $v_{30}$ melt extensibility of 225 to 260 mm/s Accordingly in another specific embodiment the high melt strength polypropylene (HMS-PP), has a melt flow rate $MFR_2$ (230° C.) in a range of 0.5 to 7.0 g/10 min, an $F_{30}$ melt strength of more than 25.0 to 45.0 cN and $v_{30}$ melt extensibility of 210 to 300 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 6.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.5 to 5.0 g/10 min, an $F_{30}$ melt strength of more than 25.0 to 40.0 cN and $v_{30}$ melt extensibility of 225 to 260 mm/s.

Preferably, the high melt strength polypropylene (HMS-PP), has a melting point of at least 130° C., more preferably of at least 135° C. and most preferably of at least 140° C. The crystallization temperature is preferably at least 110° C., more preferably at least 120° C.

Further, the high melt strength polypropylene (HMS-PP), can be a high melt strength random propylene copolymer (R-HMS-PP), or a high melt strength propylene homopolymer (H-HMS-PP), the latter being preferred.

For the purpose of the present invention, the expression "propylene homopolymer" refers to a polypropylene that consists substantially, i.e. of at least 97 mol.-%, preferably of at least 98 mol.-%, more preferably of at least 99 mol.-%, most preferably of at least 99.8 mol.-% of propylene units. In a preferred embodiment only propylene units in the propylene homopolymer are detectable.

In case the high melt strength polypropylene (HMS-PP), is a high melt strength random propylene copolymer (R-HMS-PP), it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the high melt strength random propylene copolymer (R-HMS-PP), comprises, especially consists of, monomers copolymerizable with propylene from the group consisting of ethylene, 1 butene and 1-hexene. More specifically the high melt strength random propylene copolymer (R-HMS-PP), comprises—apart from propylene—units derivable from ethylene and/or 1-butene. In a preferred embodiment the high melt strength random propylene copolymer (R-HMS-PP), consists of units derivable from ethylene and propylene only. The comonomer content in the high melt strength random propylene copolymer (R-HMS-PP), is preferably in the range of more than 0.2 to 10.0 mol.-%, still more preferably in the range of more than 0.5 to 7.0 mol.-%.

In this regard it is to mention that the high melt strength polypropylene (HMS-PP) being either a high melt strength propylene homopolymer (H-HMS-PP) or a high melt strength random propylene copolymer (R-HMS-PP) may comprise additionally unsaturated monomers different to the comonomers defined for the high melt strength random propylene copolymer (R-HMS-PP). In other words the high melt strength propylene homopolymer (H-HMS-PP) or the high melt strength random propylene copolymer (R-HMS-PP) may comprise unsaturated units, like bifunctionally unsaturated monomer(s) and/or multifunctionally unsaturated low molecular weight polymer(s) as defined in detail below, being different to propylene, ethylene and other $C_4$ to $C_{12}$ α-olefins. Accordingly the definition of homopolymer and copolymer in view of the high melt strength polypropylene (HMS-PP) refers actually to the unmodified polypropylene, i.e. to the polypropylene (PP), which is preferably a linear polypropylene (l-PP), used to obtain the melt strength polypropylene (HMS-PP) by chemical modification as defined in detail below.

Accordingly in one preferred embodiment the high melt strength polypropylene (HMS-PP), comprises (a) if it is a high melt strength propylene homopolymer (H-HMS-PP) units derived from (i) propylene and (ii) bifunctionally unsaturated monomer(s) and/or multifunctionally unsaturated low molecular weight polymer(s), or (b) if it is a high melt strength random propylene copolymer (R-HMS-PP) units derived from (i) propylene (ii) ethylene and/or $C_4$ to $C_{12}$ α-olefins, e.g. 1-butene and/or 1-hexene, preferably erthylene, and (iii) bifunctionally unsaturated monomer(s) and/or multifunctionally unsaturated low molecular weight polymer(s), "Bifunctionally unsaturated" or "multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals (see below). The unsaturated sites in the bi- or multifunctionally unsaturated compounds are in their chemically bound state not actually "unsaturated", because the double bonds are each used for a covalent bond to the polymer chains of the unmodified polypropylene, i.e. of the polypropylene (PP), preferably of the linear polypropylene (l-PP).

Reaction of the bifunctionally unsaturated monomer(s) and/or multifunctionally unsaturated low molecular weight polymer(s), preferably having a number average molecular weight (Mn)≤10000 g/mol, synthesized from one and/or more unsaturated monomers with the unmodified polypropylene, i.e. with the polypropylene (PP), preferably with the linear polypropylene (l-PP), are performed in the presence of a thermally free radical forming agent, e. g. decomposing free radical-forming agent, like a thermally decomposable peroxide.

The bifunctionally unsaturated monomers may be
- divinyl compounds, such as divinylaniline, m-divinylbenzene, p-divinylbenzene, divinylpentane and divinylpropane;
- allyl compounds, such as allyl acrylate, allyl methacrylate, allyl methyl maleate and allyl vinyl ether;
- dienes, such as 1,3-butadiene, chloroprene, cyclohexadiene, cyclopentadiene, 2,3-dimethylbutadiene, heptadiene, hexadiene, isoprene and 1,4-pentadiene;
- aromatic and/or aliphatic bis (maleimide) bis (citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight (Mn)≤10000 g/mol may be synthesized from one or more unsaturated monomers.

Examples of such low molecular weight polymers are
- polybutadienes, especially where the different microstructures in the polymer chain, i.e. 1,4-cis, 1,4-trans and 1,2-(vinyl) are predominantly in the 1,2-(vinyl) configuration
- copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP), may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP), is 0.01 to 10.0 wt.-% based on said high melt strength polypropylene (HMS-PP).

In a preferred embodiment the high melt strength polypropylene (HMS-PP), is free of additives (A). Accordingly, in case the instant polypropylene composition comprises additives (A), these additives (A) are not brought in the polypropylene composition during the manufacture of the high melt strength polypropylene (HMS-PP).

The high melt strength polypropylene (HMS-PP) further preferably has a low gel content usually below 1.00 wt. %. Preferably the gel content is less than 0.80 wt. %, more preferably less than 0.50 wt. %.

As mentioned above, the high melt strength polypropylene (HMS-PP), may be obtained by treating the polypropylene (PP), preferably the linear polypropylene (l-PP), with thermally decomposing radical-forming agents. However, in such a case a high risk exists that the polypropylene (PP), preferably the linear polypropylene (PP), is degraded, which is detrimental. Thus, it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the high melt strength polypropylene (HMS-PP), is for instance disclosed in EP 0 787 750, EP 0 879 830 A1 and EP 0 890 612 A2. All documents are herewith included by reference.

Thereby, the amount of thermally decomposing radical-forming agents, preferably of peroxide, is preferably in the range of 0.05 to 3.00 wt.-% based on the amount of the polypropylene (PP). Typically, the thermally decomposing radical-forming agents are added together with the bifunctionally unsaturated monomer(s) and/or with multifunctionally unsaturated low molecular weight polymer(s) to the polypropylene (PP), preferably to the linear polypropylene (l-PP). However it is also possible, but less preferred, that first the bifunctionally unsaturated monomer(s) and/or multifunctionally unsaturated low molecular weight polymer(s) is/are added to the polypropylene (PP), preferably to the linear polypropylene (l-PP), and subsequent the thermally decomposing radical-forming agents, or the other way round, first the thermally decomposing radical-forming agents are added to the polypropylene (PP), preferably to the linear polypropylene (l-PP), and subsequent the bifunctionally unsaturated monomer(s) and/or multifunctionally unsaturated low molecular weight polymer(s).

Concerning the bifunctionally unsaturated monomer(s) and/or multifunctionally unsaturated low molecular weight polymer(s) used for the manufacture of the high melt strength polypropylene (HMS-PP), reference is made to the section above.

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide. Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Also contemplated are mixtures of these above listed free radical-forming agents.

A suitable HMS-PP is WB140HMS™ commercially available from Borealis AG.

The Polypropylene (PP)

As mentioned above, the high melt strength polypropylene (HMS-PP), is a modified polypropylene, which is obtained by reacting the polypropylene (PP) with a thermally decomposing free radical-forming agent and optionally with bifunctionally unsaturated monomer(s) and/or with multifunctionally unsaturated low molecular weight polymer(s). The polypropylene (PP) is preferably a linear polypropylene (l-PP)

It is preferred that the polypropylene (PP), preferably the linear polypropylene (l-PP), has a melt flow rate $MFR_2$ (230° C.) measured according to ISO 1133 in the range of 0.1 to 45.0 g/10 min, like of 0.1 to 40.0 g/10 min or 0.1 to 35.0 g/10 min, more preferably of 0.1 to 30.0 g/10 min, still more preferably of 0.1 to 28.0 g/10 min, yet more preferably of 0.1 to 25.0 g/10 min.

The high melt strength polypropylene (HMS-PP) differs from the polypropylene (PP) which is used for its manufacture in that the backbone of the high melt strength polypropylene (HMS-PP) covers side chains whereas the staring product, i.e. the polypropylene (PP) including the preferred linear polypropylene (l-PP), does not cover or nearby does not cover side chains. The side chains have significant impact on the rheology of the polypropylene. Accordingly the starting product, i.e. the polypropylene (PP), and the obtained high melt strength polypropylene (HMS-PP), can be clearly distinguished by its flow behaviour under stress.

Further, as mentioned above the polypropylene (PP) is preferably a linear polypropylene (l-PP). The same considerations apply to the polypropylene (PP') as discussed in detail below which is also in a preferred embodiment a linear polypropylene (l-PP'). Accordingly, throughout the instant invention, the term "linear polypropylene" indicates that the linear polypropylene, shows no or nearby no-branching structure. Due to the absence of branches, the linear polypropylenes, i.e. the linear polypropylene (l-PP) and the linear polypropylene (l-PP'), are preferably featured by a low $v_{30}$ melt extensibility and/or a low $F_{30}$ melt strength.

Thus it is preferred that the linear polypropylene (l-PP) has (a) a $F_{30}$ melt strength of less than 30.0 cN, preferably of less than 27.0 cN, more preferably in the range of 1.0 to less than 30.0 cN, still more preferably in the range of 1.5 to less than 30.0 cN, yet more preferably in the range of 2.0 to less than 27.0 cN, still yet more preferably in the range of 2.5 to less than 27.0 cN;

and (b) a $v_{30}$ melt extensibility of below 220 mm/s, preferably of below 210 mm/s, more preferably in the range of 80 to 200 mm/s, most preferably in the range of 100 to 200 mm/s.

In other words it is preferred that the linear polypropylene (l-PP) has a $F_{30}$ melt strength of less than 30.0 cN and a $v_{30}$ melt extensibility of below 220 mm/s, preferably a $F_{30}$ melt strength of less than 27.0 cN and a $v_{30}$ melt extensibility of below 210 mm/s, more preferably a $F_{30}$ melt strength in the range of 1.0 to less than 30.0 cN and a $v_{30}$ melt extensibility in the range of 80 to 200 mm/s, yet more preferably a $F_{30}$ melt strength in the range of 1.5 to less than 30.0 cN and a $v_{30}$ melt extensibility in the range of 100 to 200 mm/s, still yet more preferably a $F_{30}$ melt strength in the range of 2.0 to less than 27.0 cN and a $v_{30}$ melt extensibility in the range of 100 to 200 mm/s, like a $F_{30}$ melt strength in the range of 2.5 to less than 27.0 cN.

Accordingly in one specific embodiment the linear polypropylene (l-PP) has (a) a melt flow rate $MFR_2$ (230° C.) measured according to ISO 1133 in the range of 0.1 to 45.0 g/10 min, like of 0.1 to 40.0 g/10 min or 0.1 to 35.0 g/10 min, more preferably of 0.1 to 30.0 g/10 min, still more preferably of 0.1 to 28.0 g/10 min, yet more preferably of 0.1 to 25.0 g/10 min; and (b) a $F_{30}$ melt strength of less than 30.0 cN, preferably of less than 27.0 cN, more preferably in the range of 1.0 to less than 30.0 cN, still more preferably in the range of 1.5 to less than 30.0 cN, yet more preferably in the range of 2.0 to less than 27.0 cN, still yet more preferably in the range of 2.5 to less than 27.0 cN; and (c) a $v_{30}$ melt extensibility of below 220 mm/s, preferably of below 210 mm/s, more preferably in the range of 80 to 200 mm/s, most preferably in the range of 100 to 200 mm/s.

Therefore, in one specific embodiment the polypropylene (PP) is a linear polypropylene (l-PP) having a melt flow rate $MFR_2$ (230° C.) of 0.1 to 45.0 g/10 min, a $F_{30}$ melt strength of less than 30.0 cN and a $v_{30}$ melt extensibility of below 220 mm/s, preferably a melt flow rate $MFR_2$ (230° C.) in the range of 0.1 to 40.0 g/10 min, a $F_{30}$ melt strength of less than 30.0 cN and a $v_{30}$ melt extensibility of below 210 mm/s, more preferably a melt flow rate $MFR_2$ (230° C.) in the range of 0.1 to 35.0 g/10 min, a $F_{30}$ melt strength in the range of 1.0 to less than 30.0 cN and a $v_{30}$ melt extensibility in the range of 80 to 200 mm/s, yet more preferably a melt flow rate $MFR_2$ (230° C.) in the range of 0.1 to 30.0 g/10 min, a $F_{30}$ melt strength in the range of 1.5 to less than 30.0 cN and a $v_{30}$ melt extensibility in the range of 100 to 200 mm/s, still yet more preferably a melt flow rate $MFR_2$ (230° C.) in the range of 0.1 to 28.0 g/10 min, a $F_{30}$ melt strength in the range of 2.0 to less than 27.0 cN and a $v_{30}$ melt extensibility in the range of 100 to 200 mm/s, like a melt flow rate $MFR_2$ (230° C.) in the range of 0.1 to 25.0 g/10 min, a $F_{30}$ melt strength in the range of 2.5 to less than 27.0 cN and a $v_{30}$ melt extensibility in the range of 100 to 200 mm/s.

Preferably, the polypropylene (PP), preferably the linear polypropylene (l-PP), has a melting point of at least 140° C., more preferably of at least 150° C. and still more preferably of at least 158° C.

The polypropylene (PP), preferably the linear polypropylene (l-PP), can be produced in a known manner for instance by employing a single-site or a Ziegler Natta catalyst. The polypropylene (PP), preferably the linear polypropylene (l-PP), can be a propylene homopolymer (H-PP), preferably a linear propylene homopolymer (l-H-PP), or a propylene copolymer (R-PP), preferably a linear propylene copolymer (l-R-PP). Concerning the comonomer content and type of comonomer it is referred to the information provided above for the high melt strength random propylene copolymer (R-HMS-PP). Preferably the polypropylene (PP) is a linear polypropylene (l-PP). Still more preferably the polypropylene (PP) is a linear propylene homopolymer (l-H-PP). Accordingly, all information provided with regard to melt flow rate $MFR_2$ (230° C.), melting point, $F_{30}$ melt strength, $v_{30}$ melt extensibility, and particle size and particle size distribution, respectively, applies especially for the linear propylene homopolymer (l-H-PP).

In a preferred embodiment the polypropylene (PP), preferably the linear polypropylene (l-PP), is free of additives (A). Accordingly, in case the instant polypropylene composition comprises additives (A), these additives (A) are preferably not brought in the polypropylene composition during the manufacture of the high melt strength polypropylene (HMS-PP).

Recycled Polypropylene (R-PP) and/or Linear Polypropylene (L-PP)

It is appreciated that the polypropylene composition comprises recycled polypropylene (R-PP) and/or linear polypropylene (L-PP). That is to say, the polypropylene composition may comprise a mixture of recycled polypropylene (R-PP) and linear polypropylene (L-PP). Alternatively, the polypropylene composition comprises recycled polypropylene (R-PP) or linear polypropylene (L-PP).

Preferably, the polypropylene composition comprises recycled polypropylene (R-PP) and linear polypropylene (L-PP), i.e. a mixture of recycled polypropylene (R-PP) and linear polypropylene (L-PP).

The recycled polypropylene (R-PP) and/or linear polypropylene (L-PP) preferably has at least one of the following properties:

a) an MFR, determined according to ISO 1133, at a temperature of 230° C. and under a load of 2.16 kg, of 3 to 25 g/10 min;

b) an $F_{30}$ melt strength of less than 25.0 cN, determined according to ISO 16790:2005;

In one embodiment, the recycled polypropylene (R-PP) and/or linear polypropylene (L-PP) has at least an $F_{30}$ melt strength of less than 25.0 cN, determined according to ISO 16790:2005 or an MFR, determined according to ISO 1133, at a temperature of 230° C. and under a load of 2.16 kg, of 3 to 25 g/10 min. Alternatively, the recycled polypropylene (R-PP) and/or linear polypropylene (L-PP) has at least an $F_{30}$ melt strength of less than 25.0 cN, determined according to ISO 16790:2005 and an MFR, determined according to ISO 1133, at a temperature of 230° C. and under a load of 2.16 kg, of 3 to 25 g/10 min.

The recycled polypropylene (R-PP) and/or linear polypropylene (L-PP) preferably has a melt flow rate $MFR_2$ (230° C.) measured according to ISO 1133 in a range of 4 to 20 g/10 min, more preferably in a range of 5 to 15 g/10 min.

Preferably, the recycled polypropylene (R-PP) and/or linear polypropylene (L-PP) preferably has an $F_{30}$ melt strength of less than 20.0 cN, more preferably in the range of 1.0 to less than 20.0 cN determined according to ISO 16790:2005.

For example, the recycled polypropylene (R-PP) and/or linear polypropylene (L-PP) preferably has an $F_{30}$ melt strength of less than 20.0 cN, determined according to ISO 16790:2005, and a melt flow rate $MFR_2$ (230° C.) measured according to ISO 1133 in a range of 4 to 20 g/10 min, more preferably an $F_{30}$ melt strength in the range of 1.0 to less than 20.0 cN determined according to ISO 16790:2005, and a melt flow rate $MFR_2$ (230° C.) measured according to ISO 1133 in a range of 5 to 15 g/10 min.

For example, the recycled polypropylene (R-PP) has at least one of the following properties:

a) an MFR, determined according to ISO 1133, at a temperature of 230° C. and under a load of 2.16 kg, of 3 to 25 g/10 min;

b) an $F_{30}$ melt strength of less than 25.0 cN, determined according to ISO 16790:2005;

c) a $v_{30}$ melt extensibility of more than 200 mm/s, determined according to ISO 16790:2005.

For example, the recycled polypropylene (R-PP) has at least an $F_{30}$ melt strength of less than 25.0 cN, determined according to ISO 16790:2005 and/or a $v_{30}$ melt extensibility of more than 200 mm/s, determined according to ISO 16790:2005, more preferably, the recycled polypropylene (R-PP) has at least an $F_{30}$ melt strength of less than 25.0 cN, determined according to ISO 16790:2005 and a $v_{30}$ melt extensibility of more than 200 mm/s, determined according to ISO 16790:2005, even more preferably the recycled polypropylene (R-PP) has at least an $F_{30}$ melt strength of less than 25.0 cN, determined according to ISO 16790:2005, a $v_{30}$ melt extensibility of more than 200 mm/s, determined according to ISO 16790:2005 and an MFR, determined according to ISO 1133, at a temperature of 230° C. and under a load of 2.16 kg, of 3 to 25 g/10 min.

Preferably, the recycled polypropylene (R-PP) has an $v_{30}$ melt extensibility of more than 205 mm/s, more preferably more than 205 to 290 mm/s, determined according to ISO 16790:2005.

In one embodiment, the recycled polypropylene (R-PP) has an $F_{30}$ melt strength of less than 20.0 cN, determined according to ISO 16790:2005, and an $v_{30}$ melt extensibility of more than 205 mm/s, determined according to ISO 16790:2005, and a melt flow rate $MFR_2$ (230° C.) measured according to ISO 1133 in a range of 4 to 20 g/10 min, more preferably an $F_{30}$ melt strength in the range of 1.0 to less than 20.0 cN determined according to ISO 16790:2005, and an $v_{30}$ melt extensibility of more than 205 to 290 mm/s, determined according to ISO 16790:2005, and a melt flow rate $MFR_2$ (230° C.) measured according to ISO 1133 in a range of 5 to 15 g/10 min.

Alternatively, the linear polypropylene (L-PP) has at least one of the following properties a) an MFR, determined according to ISO 1133, at a temperature of 230° C. and under a load of 2.16 kg, of 3 to 25 g/10 min;

b) an $F_{30}$ melt strength of less than 25.0 cN, determined according to ISO 16790:2005;

c) a $v_{30}$ melt extensibility of less than 200 mm/s determined according to ISO 16790:2005.

In one embodiment, the linear polypropylene (L-PP) has at least an $F_{30}$ melt strength of less than 25.0 cN, determined according to ISO 16790:2005 and/or a $v_{30}$ melt extensibility of less than 200 mm/s, determined according to ISO 16790:2005, more preferably, the linear polypropylene (L-PP) has at least an $F_{30}$ melt strength of less than 25.0 cN, determined according to ISO 16790:2005 and a $v_{30}$ melt extensibility of less than 200 mm/s, determined according to ISO 16790:2005, even more preferably the linear polypropylene (L-PP) has at least an $F_{30}$ melt strength of less than 25.0 cN, determined according to ISO 16790:2005, a $v_{30}$ melt extensibility of less than 200 mm/s, determined according to ISO 16790:2005 and an MFR, determined according to ISO 1133, at a temperature of 230° C. and under a load of 2.16 kg, of 3 to 25 g/10 min.

Preferably, the linear polypropylene (L-PP) has an $v_{30}$ melt extensibility of less than 190 mm/s, more preferably in the range of 100 to less than 190 mm/s, most preferably in the range of 120 to less than 190 mm/s, determined according to ISO 16790:2005.

For example, the linear polypropylene (L-PP) has at least an $F_{30}$ melt strength of less than 25.0 cN, determined according to ISO 16790:2005, a $v_{30}$ melt extensibility of less than 190 mm/s, determined according to ISO 16790:2005 and an MFR, determined according to ISO 1133, at a temperature of 230° C. and under a load of 2.16 kg, of 3 to 25 g/10 min. Preferably, the linear polypropylene (L-PP) has at least an $F_{30}$ melt strength of less than 25.0 cN, determined according to ISO 16790:2005, a $v_{30}$ melt extensibility in the range of 100 to less than 190 mm/s, determined according to ISO 16790:2005 and an MFR, determined according to ISO 1133, at a temperature of 230° C. and under a load of 2.16 kg, of 3 to 25 g/10 min. More preferably, the linear polypropylene (L-PP) has at least an $F_{30}$ melt strength of less than 25.0 cN, determined according to ISO 16790:2005, a $v_{30}$ melt extensibility in the range of 120 to less than 190 mm/s, determined according to ISO 16790:2005 and an MFR, determined according to ISO 1133, at a temperature of 230° C. and under a load of 2.16 kg, of 3 to 25 g/10 min.

In one embodiment, the linear polypropylene (L-PP) has an $F_{30}$ melt strength of less than 20.0 cN, determined according to ISO 16790:2005, and an $v_{30}$ melt extensibility in the range of 100 to less than 190 mm/s, determined according to ISO 16790:2005, and a melt flow rate $MFR_2$ (230° C.) measured according to ISO 1133 in a range of 4 to 20 g/10 min, more preferably an $F_{30}$ melt strength in the range of 1.0 to less than 20.0 cN determined according to ISO 16790:2005, and an $v_{30}$ melt extensibility in the range of 120 to less than 190 mm/s, determined according to ISO 16790:2005, and a melt flow rate $MFR_2$ (230° C.) measured according to ISO 1133 in the range of 5 to 15 g/10 min.

Alternatively, the mixture comprising the recycled polypropylene (R-PP) and linear polypropylene (L-PP) preferably has at least one of the following properties:

a) an MFR, determined according to ISO 1133, at a temperature of 230° C. and under a load of 2.16 kg, of 3 to 25 g/10 min;
b) an $F_{30}$ melt strength of less than 25.0 cN, determined according to ISO 16790:2005;
c) a $v_{30}$ melt extensibility of more than 100 mm/s, preferably in the range from more than 100 to 290 mm/s, determined according to ISO 16790:2005.

In one embodiment, the mixture comprising the recycled polypropylene (R-PP) and linear polypropylene (L-PP) has at least an $F_{30}$ melt strength of less than 25.0 cN, determined according to ISO 16790:2005 and/or a $v_{30}$ melt extensibility of more than 100 mm/s, determined according to ISO 16790:2005, more preferably, the mixture comprising the recycled polypropylene (R-PP) and linear polypropylene (L-PP) has at least an $F_{30}$ melt strength of less than 25 cN, determined according to ISO 16790:2005 and a $v_{30}$ melt extensibility of more than 100 mm/s, determined according to ISO 16790:2005, even more preferably the mixture comprising the recycled polypropylene (R-PP) and linear polypropylene (L-PP) has at least an $F_{30}$ melt strength of less than 25.0 cN, determined according to ISO 16790:2005, a $v_{30}$ melt extensibility of more than 100 mm/s, determined according to ISO 16790:2005 and an MFR, determined according to ISO 1133, at a temperature of 230° C. and under a load of 2.16 kg, of 3 to 25 g/10 min.

For example, the mixture comprising the recycled polypropylene (R-PP) and linear polypropylene (L-PP) has an $F_{30}$ melt strength of less than 20.0 cN, determined according to ISO 16790:2005, and an $v_{30}$ melt extensibility of more than 100 mm/s, determined according to ISO 16790:2005, and a melt flow rate $MFR_2$ (230° C.) measured according to ISO 1133 in a range of 4 to 20 g/10 min, more preferably an $F_{30}$ melt strength in the range of 1.0 to less than 20.0 cN determined according to ISO 16790:2005, and an $v_{30}$ melt extensibility in the range from more than 100 to 290 mm/s, determined according to ISO 16790:2005, and a melt flow rate $MFR_2$ (230° C.) measured according to ISO 1133 in a range of 5 to 15 g/10 min.

The recycled polypropylene (R-PP) polypropylene (L-PP) may be a recycled polypropylene (Rec-PP) and/or the linear polypropylene (L-PP) may be a linear polypropylene (Lin-PP).

The linear polypropylene (Lin-PP), can be produced in a known manner for instance by employing a single-site or a Ziegler Natta catalyst. The linear polypropylene (Lin-PP) can be a linear propylene homopolymer (Lin-H-PP), or a linear propylene random copolymer (Lin-Ran-PP).

The linear propylene random copolymer (Lin-Ran-PP) comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the linear propylene random copolymer (Lin-Ran-PP) comprises, especially consists of, monomers copolymerizable with propylene from the group consisting of ethylene, 1 butene and 1-hexene. More specifically the linear propylene random copolymer (Lin-Ran-PP), comprises—apart from propylene—units derivable from ethylene and/or 1-butene. In a preferred embodiment the linear propylene random copolymer (Lin-Ran-PP) consists of units derivable from ethylene and propylene only.

The comonomer content in linear propylene random copolymer (Lin-Ran-PP), is preferably in the range of more than 0.2 to 10.0 mol.-%, still more preferably in the range of more than 0.5 to 7.0 mol.-%.

Preferably, the recycled polypropylene (R-PP) and/or polypropylene (L-PP) is a recycled polypropylene (Rec-PP) comprising at least 50 wt. % of recycled high melt strength polypropylene (HMS-PP), more preferably at least 75 wt. % recycled high melt strength polypropylene (HMS-PP) and most preferably at least 85 wt. % recycled high melt strength polypropylene (HMS-PP). The remainder of the recycled polypropylene (Rec-PP) may originate, e.g. from cover layers used in cup production etc.

The Nucleating Agent (NA)

The polypropylene composition (PC) further comprises one or more, preferably one, nucleating agent(s).

In general, it is appreciated that the polypropylene composition (PC) can comprise any nucleating agent(s) typically used in the products to be prepared and known to the skilled person.

For example, suitable nucleating agents include organic alpha-nucleating agents selected from the group of phosphorous based nucleating agents for instance mono-, bis- or tetra-phenyl phosphates or phosphoric acid esters metal salts represented by the following formula (I)

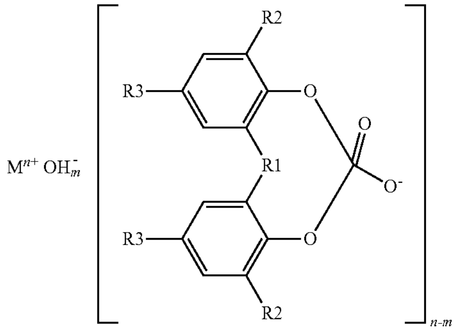

wherein R1 is oxygen, sulphur or a hydrocarbon group of 1 to 10 carbon atoms; each of R2 and R3 is hydrogen or a hydrocarbon or a hydrocarbon group of 1 to 10 carbon atoms; R2 and R3 may be the same or different from each other, two of R2, two of R3, or R2 and R3 may be bonded together to form a ring, M is a monovalent to trivalent metal atom; n is an integer from 1 to 3 and m is either 0 or 1, provided that n>m.

Preferred examples of the alpha nucleating agents represented by the above formula include sodium-2,2'-methylene-bis(4,6-di-tert.-butyl-phenyl)phosphate, sodium-2,2'-ethylidene-bis(4,6-di-tert.-butylphenyl)-phosphate, lithium-2,2'-methylene-bis(4,6-di-tert.-butylphenyl)phosphate, lithium-2,2'-ethylidene-bis(4,6-di-tert.-butylphenyl)phosphate, sodium-2,2'-ethyli-dene-bis(4-i-propyl-6-tert.-butylphenyl)phosphate, lithium-2,2'-methylene-bis(4-methyl-6-tert.-butylphenyl)phosphate, lithium-2,2'-methylene-bis(4-ethyl-6-tert.-butylphenyl)phosphate, calcium-bis[2,2'-thiobis(4-methyl-6-tert.-butyl-phenyl)-phosphate], calcium-bis[2,2'-thiobis(4-ethyl-6-tert.-butylphenyl)-phosphate], calcium-bis[2,2'-thiobis(4,6-di-tert.-butylphenyl)phosphate], magnesium-bis[2,2'-thiobis(4,6-di-tert.-butylphenyl)phosphate], magnesium-bis[2,2'-thiobis(4-t-octylphenyl)phosphate], sodium-2,2'-butylidene-bis(4,6-dimethylphenyl)phosphate, sodium-2,2'-butylidene-bis(4,6-di-tert.-butyl-phenyl)-phosphate, sodium-2,2'-t-octylmethylene-bis(4,6-dimethyl-phenyl)-phosphate, sodium-2,2'-t-octylmethylene-bis(4,6-di-tert.-butylphenyl)-phosphate, calcium-bis[2,2'-methylene-bis(4,6-di-tert.-butylphenyl)-phosphate], magnesium-bis[2,2'-methylene-bis(4,6-di-tert.-butylphenyl)-phosphate], barium-bis[2,2'-methylene-bis(4,6-di-tert.-butylphenyl)-phosphate], sodium-2,2'-methylene-bis(4-methyl-6-tert.-butylphenyl)-phosphate, sodium-2,2'-methylene-bis(4-ethyl-6-tert.-butylphenyl)phosphate, sodium(4,4'-dimethyl-5,6'-di-tert.-butyl-2,2'-biphenyl)phosphate, calcium-bis-[(4,4'-dimethyl-6,6'-di-tert.-butyl-2,2'-biphenyl)phosphate], sodium-2,2'-ethyli-dene-bis(4-m-butyl-6-tert.-butyl-phenyl)phosphate, sodium-2,2'-methylene-bis-(4,6-di-methylphenyl)-phosphate, sodium-2,2'-methylene-bis(4,6-di-t-ethyl-phenyl) phosphate, potassium-2,2'-ethylidene-bis(4,6-di-tert.-butylphenyl)-phosphate, calcium-bis[2,2'-ethylidene-bis(4,6-di-tert.-butylphenyl)-phosphate], magnesium-bis[2,2'-ethyli-dene-bis(4,6-di-tert.-butylphenyl)-phosphate], barium-bis[2,2'-ethylidene-bis-(4,6-di-tert.-butylphenyl)-phosphate], aluminium-hydroxy-bis[2,2'-methylene-bis(4,6-di-tert.-butyl-phenyl)phosphate], aluminium-tris[2,2'-ethylidene-bis(4,6-di-tert.-butylphenyl)-phosphate].

A second group of phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato] and blends thereof with Li-myristate or Li-stearate.

Also sorbitol-based nucleating agents, like optionally substituted dibenzylidine sorbitol (e.g. 1,3:2,4 Dibenzylidene sorbitol, 1,3:2,4 Di(methylbenzylidene) sorbitol 1,3:2,4 Di(ethylbenzylidene) sorbitol, 1,3:2,4 Bis(3,4-dimethylbenzylidene) sorbitol, etc.) or pine rosin can be used as nucleating agents.

Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Suitable alpha-nucleating agents for the polyolefin composition of the invention are in addition nucleating agents, as described for example in Macromolecules 2005, 38, 3688-3695, the disclosure of which is incorporated herein by reference.

Nucleating agents such as ADK NA-11 (Methylen-bis(4,6-di-t-butylphenyl)phosphate sodium salt) and ADK NA-21 (comprising aluminium hydroxy-bis[2,4,8,10-tetrakis(1,1-dimethylethyl)-6-hydroxy-12H-dibenzo-[d,g]-dioxa-phoshocin-6-oxidato]) are also suitable and commercially available from Asahi Denka Kokai. Millad 3988 (3,4-Dimethylbenzylidene sorbitol), Millad 3905 and Millad 3940 available from Milliken & Company are other examples of nucleating agents that can be utilised in the invention.

Further commercial available alpha-nucleating agents, which can be used for the composition of the invention are, for example, Irgaclear XT 386 (N-[3,5-bis-(2,2-dimethyl-propionylamino)-phenyl]-2,2-dimethylpropionamide) from Ciba Specialty Chemicals, Hyperform HPN-68L and Hyperform HPN-20E from Milliken & Company.

Nonitol based nucleating agents, for instance 1,2,3-trideoxy-4,6:5,7-bis-O-((4-propylphenyl) methylene) nonitol (CAS-no. 882073-43-0, e.g. Millad NX8000, supplier Milliken) are also suitable.

Further suitable nucleating agents are the chemical foaming agents, available under the tradename "Hydrocerol" from Clariant, Talc is a further suitable nucleating agent.

Talc is particularly preferred. In a preferred embodiment talc is the only nucleating agent present in the polypropylene composition (PC).

The particle size d50 of the nucleating agent, e.g. talc, is within the range of 1 μm to 30 μm, preferably within the range of 2 μm to 25 μm, more preferably within the range of 5 μm to 20 μm and most preferably within the range of 5 μm to 15 μm.

Additives (A)

The additives (A) can be any additives useful in the technical area of the high melt strength polypropylene (HMS-PP) and its applications. Accordingly the additives (A) to be used in the polypropylene composition of the invention and thus in form of the additive mixture (AM) include, but are not limited to, stabilizers such as antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), or UV stabilizers (e.g. hindered amine light stabilizers). Other typical additives are modifiers such as antistatic or antifogging agents (e.g. ethoxylated amines and amides, or glycerol esters), acid scavengers, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), as well as slip and antiblocking agents (e.g. Ca-stearate, erucamide, oleamide, talc natural silica and synthetic silica, or zeolites). Preferably the additives (A) are selected from the group consisting of antioxidants (e.g. sterically hindered phenols, phosphites/phosphonites, sulphur containing antioxidants, alkyl radical scavengers, aromatic amines, hindered amine stabilizers, or blends thereof), metal deactivators (e.g. Irganox MD 1024), UV stabilizers (e.g. hindered amine light stabilizers), antistatic or antifogging agents (e.g. ethoxylated amines and amides, or glycerol esters), acid scavengers, cling agents (e.g. polyisobutene), lubricants and resins (ionomer waxes, PE- and ethylene copolymer waxes, Fischer-Tropsch waxes, Montan-based waxes, Fluoro-based compounds, or paraffin waxes), slip agents (e.g. Ca-stearate), antiblocking agents (e.g. erucamide, oleamide, talc natural silica and synthetic silica, or zeolites) and mixtures thereof.

Preferable additives are slip agents, such as for example Ca-stearate.

As outlined above, the additives (A) do not encompass nucleating agent.

Typically the total amount of additives (A) is not more than 15 wt.-%, more preferably not more than 10 wt.-%, like in the range of 0.1 to 10 wt.-%, preferably 0.1 to 5 wt. %, more preferably 0.2 to 1 wt. % based on the total weight of the polypropylene composition.

The Polypropylene Composition

The polypropylene composition comprises:

- 10.0 to 50.0 wt. %, preferably 15.0 to 40.0 wt. %, more preferably 20.0 to 30.0 wt. % of the recycled polypropylene (R-PP) and/or linear polypropylene (L-PP);
- 40.0 to 89.95 wt. %, preferably 57.5 to 84.95 wt. %, more preferably 69.0 to 79.9 wt. % of the high melt strength polypropylene (HMS-PP) having an $F_{30}$ melt strength of more than 25.0 cN and a $v_{30}$ melt extensibility of more than 205 mm/s, wherein the $F_{30}$ melt strength and the $v_{30}$ melt extensibility are determined according to ISO 16790:2005; and
- 0.05 to 10.0 wt. %, preferably 1.0 to 8.0 wt. %, more preferably 4.0 to 6.0 wt. %, e.g. from 5.0 to 6.0 wt. %, of the nucleating agent (NA).

It is appreciated that, if not stated otherwise, all amounts are based on the total weight of the polypropylene composition.

The total amount of recycled polypropylene (R-PP) and/or linear polypropylene (L-PP) present in the polypropylene composition is 10.0 to 50.0 wt. %, preferably 15.0 to 40.0 wt. %, more preferably 20.0 to 30.0 wt. %.

The total amount of high melt strength polypropylene (HMS-PP) having an $F_{30}$ melt strength of more than 25.0 cN and a $v_{30}$ melt extensibility of more than 205 mm/s, wherein the $F_{30}$ melt strength and the $v_{30}$ melt extensibility are determined according to ISO 16790:2005 present in the polypropylene composition is 40.0 to 89.95 wt. %, preferably 57.5 to 84.95 wt. %, more preferably 69.0 to 79.9 wt. %.

The total amount of nucleating agent (NA) present in the polypropylene composition is 0.05 to 10.0 wt. %, preferably 1.0 to 8.0 wt. %, more preferably 4.0 to 6.0 wt. %, e.g. from 5.0 to 6.0 wt. %.

In a preferred embodiment besides the recycled polypropylene (R-PP) and/or linear polypropylene (L-PP), the high melt strength polypropylene (HMS-PP), other polymers are only present in a total amount not exceeding 5 wt.-%, more preferably not exceeding 2 wt.-%, still more preferably not exceeding 1 wt.-%, based on the total weight of the polymeric materials present in the polypropylene composition.

As mentioned above the high melt strength polypropylene (HMS-PP), is a major part in the instant polypropylene composition. Accordingly, it is preferred that the final polypropylene composition shows a similar rheology behavior as the high melt strength polypropylene (HMS-PP).

Therefore the polypropylene composition preferably has an $F_{30}$ melt strength of more than 25.0 cN and a $v_{30}$ melt extensibility of more than 205 mm/s, preferably has an $F_{30}$ melt strength of more than 25.0 to 50.0 cN and a $v_{30}$ melt extensibility of more than 205 to 300 mm/s, in order to provide a resulting polypropylene composition with good shear thinning properties. The $F_{30}$ melt strength and the $v_{30}$ melt extensibility are measured according to ISO 16790: 2005.

In a preferred embodiment, the polypropylene composition has (a) an $F_{30}$ melt strength of more than 25.0 to 45.0 cN, preferably more than 25.0 to 42.0 cN and most preferably more than 25.0 cN to 40.0 cN;

and (b) a $v_{30}$ melt extensibility of more than 210 to 300 mm/s, more preferably of 215 to 290 mm/s, even more preferably 220 to 270 mm/s and most preferably 225 to 260 mm/s.

In an especially preferred embodiment the polypropylene composition has an $F_{30}$ melt strength of more than 25.0 to 45.0 cN and $v_{30}$ melt extensibility of 215 to 290 mm/s, like an $F_{30}$ melt strength of more than 25.0 to 42.0 cN and $v_{30}$ melt extensibility of 215 to 290 mm/s or an $F_{30}$ melt strength of more than 25.0 to 40.0 cN and $v_{30}$ melt extensibility of 220 to 270 mm/s or an $F_{30}$ melt strength of more than 25.0 to 40.0 cN and $v_{30}$ melt extensibility of 225 to 260 mm/s.

Further it is preferred that the polypropylene composition, has a melt flow rate $MFR_2$ (230° C.) measured according to ISO 1133 of not more than 15.0 g/10 min, more preferably in a range of 0.5 to 15.0 g/10 min, yet more preferably in a range of 1.0 to 15.0 g/10 min, like in the range of 1.5 to 15.0 g/10 min.

In a particularly preferred embodiment the polypropylene composition, has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Hence in one specific embodiment, the polypropylene composition, has (a) a melt flow rate $MFR_2$ (230° C.) not more than 15.0 g/10 min, more preferably in a range of 0.5 to 15.0 g/10 min, yet more preferably in a range of 1.0 to 15.0 g/10 min, like in the range of 1.5 to 15.0 g/10 min;

(b) an $F_{30}$ melt strength of more than 25.0 to 45.0 cN, preferably more than 25.0 to 42.0 cN and most preferably more than 25.0 cN to 40.0 cN; and (c) a $v_{30}$ melt extensibility of more than 210 to 300 mm/s, more preferably of 215 to 290 mm/s, even more preferably 220 to 270 mm/s and most preferably 225 to 260 mm/s.

In a particularly preferred variant of this embodiment the polypropylene composition has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min.

Accordingly in a specific embodiment the polypropylene composition has a melt flow rate $MFR_2$ (230° C.) in a range of 0.5 to 15.0 g/10 min, an $F_{30}$ melt strength of more than 25.0 to 45.0 cN and $v_{30}$ melt extensibility of 215 to 290 mm/s, like a melt flow rate $MFR_2$ (230° C.) in a range of 1.0 to 15.0 g/10 min, an $F_{30}$ melt strength of more than 25.0 to 42.0 cN and $v_{30}$ melt extensibility of 215 to 290 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 220 to 270 mm/s or a melt flow rate $MFR_2$ (230° C.) in a range of 1.0 to 15.0 g/10 min, an $F_{30}$ melt strength of more than 25.0 to 40.0 cN and $v_{30}$ melt extensibility of 225 to 260 mm/s.

In a particularly preferred variant of this embodiment the polypropylene composition has a melt flow rate $MFR_2$ (230° C.) measured according to ISO 1133 of not more than 7.0 g/10 min, preferably in a range of 0.5 to 7.0 g/10 min, more preferably in a range of 0.5 to 6.5 g/10 min, still more preferably in a range of 0.5 to 6.0 g/10 min, yet more preferably in a range of 1.0 to 6.0 g/10 min, like in the range of 1.5 to 5.0 g/10 min or like in the range of 1.0 to 5.0 g/10 min.

Foamed Sheet

The present invention is furthermore directed to a foamed sheet formed from the polypropylene composition according to the present invention.

The foam sheet of the present invention preferably has a thickness of 0.5 to 10 mm and/or a density of 150 to 250 $kg/m^3$ and most preferably from 175 to 225 $kg/m^3$. Thus, in one embodiment the present invention is directed to a foamed sheet having a thickness of 0.5 to 10 mm and/or a density of 100 to 300 $kg/m^3$, more preferably from 150 to 250 $kg/m^3$ and most preferably from 175 to 225 $kg/m^3$.

Preferably the thickness is 0.5 to 7.5 mm, more preferably 0.5 to 5.0 mm and particularly preferably 0.7 to 2.5 mm such as 0.7 to 1.1 mm.

The foam sheet preferably has a cell size diameter, determined by light optical microscope, of 100 to 500 μm, more preferably 125 to 400 μm and most preferably 170 to 320 μm.

The foam sheet is further characterized by its surface roughness. Usually the surface roughness is below 3.5 μm, preferably below 2.5 μm and most preferably below 1.5 μm.

The foamed sheet is preferably covered by a cover layer (CL).

The cover layer (CL) preferably has a density of at least 0.85 $g/cm^3$.

Preferably the cover layer (CL) comprises a polypropylene (CL-PP), preferably in an amount of at least 50 wt. %, more preferably at least 65 wt. % and most preferably at least 80 wt. %.

In case the cover layer (CL) comprises a polypropylene (CL-PP), the polypropylene (CL-PP) preferably has an MFR2, determined according to ISO 1133 at a temperature of 230° C. and under a load of 2.16 kg, of 10 to 26 g/10 min.

The cover layer may comprise up to 50 wt. %, preferably not more than 35 wt. % and most preferably not more than 20 wt. % of one or more filler(s). The term filler is meant to comprise any mineral filler or non-mineral filler capable of being homogeneously incorporated into the polyolefin composition. The one or more filler(s) are preferably inorganic fillers, e.g. selected from glass fibers, talc, carbon fibers, chalk, clay, flint, metal carbonates, mica, kaolin, wollastonite, feldspar and barytes.

The polypropylene (CL-PP) is preferably selected from the group consisting of a cast film of polypropylene, inflation film of polypropylene and a biaxial oriented polypropylene (BOPP) film. More preferably the polypropylene (CL-PP) is a biaxial oriented polypropylene (BOPP) film.

The thickness of the cover layer (CL) preferably does not exceed 100 μm, more preferably is 5 to 40 μm and most preferably 10 to 30 μm.

The cover layer may be directly adjacent to the foamed sheet of the present invention.

An adhesive layer (AL) may be present between the foamed sheet of the present invention and the cover layer (CL).

In case such an adhesive layer (AL) is present, the adhesive layer (AL) preferably comprises a polyethylene-polypropylene blend (PE-PP) having a PE:PP weight ratio of 5:95 to 95:5, preferably 5:95 to 50:50, more preferably 5:95 to 30:70 and most preferably 10:90 to 20:80.

The thickness of the adhesive layer (AL), if present, is usually larger than the cover layer (CL).

The thickness of the adhesive layer (AL), if present, preferably does not exceed 120 μm, more preferably is 20 to 80 μm, even more preferably is 30 to 70 μm and most preferably 40 to 60 μm.

However, preferably the foamed sheet and the cover layer (CL) are directly adjacent. Thus, no adhesive layer (AL) is present between the foamed sheet of the present invention and the cover layer (CL).

More preferably, no further layers besides the foamed sheet and the cover layer are present.

The Article

The present invention is furthermore directed to an article comprising the foamed sheet, preferably comprising the foamed sheet covered by the cover layer (CL) according to the present invention.

The article may be a container, e.g. a bottle, a cup, a can, a canister, a bowl or a tray; a sleeve, e.g. for a container; a lid, e.g. for a container; a film; a blank; a pad; a carrier; a tube; a substrate; a pipe; a vessel; a panel, e.g. a construction panel; a liner, e.g. a truck liner; a tape; a roll or a profile.

The article is preferably a container.

The container preferably comprises the foamed sheet covered by the cover layer (CL) according to the present invention whereby the cover layer (CL) is located on the inside of the container. The inside being the side where the fluid is located.

The container may, for example, be a bottle, a cup, a can, a canister a bowl or a tray. In a particular preferred embodiment the container is a cup, preferably the body of the cup comprises, more preferably consists of, the foamed sheet of the present invention. Preferably the body of the cup has the cover layer (CL) on the inside.

By using the foamed sheet of the present invention as cup body excellent thermal insulation properties, e.g. in case of cold and hot beverages are obtained. Moreover, the uptake of liquid into the cup is minimal as the cover layer is located on the inside of the cup thereby sealing the pores of the foamed sheet from the liquid inside the cup. Usually in cups the cover layer is located on the outside of the cups to ensure adequate printability. However, the foamed sheet according to the present invention itself has good printability thereby eliminating the need of specific layers on the outside therefor.

The Process

As already outlined above, the high melt strength polypropylene (HMS-PP) is produced by using the polypropylene (PP), preferably the linear polypropylene (l-PP). The process comprises at least a step (a) in which a polypropylene (PP) is reacted with a thermally decomposing free radical-forming agent and optionally with bifunctionally unsaturated monomer(s) and/or with multifunctionally unsaturated low molecular weight polymer(s) obtaining thereby the high melt strength polypropylene (HMS-PP).

The present invention is furthermore directed to a process comprising the following step a) producing a polypropylene composition comprising
   - 10.0 to 50.0 wt. %, preferably 15.0 to 40.0 wt. %, more preferably 20.0 to 30.0 wt. % of the recycled polypropylene (R-PP) and/or linear polypropylene (L-PP);
   - 40 to 89.95 wt. %, preferably 57.5 to 84.95 wt. %, more preferably 69.0 to 79.9 wt. % of the high melt strength polypropylene (HMS-PP) having an $F_{30}$ melt strength of more than 25.0 cN and a $v_{30}$ melt extensibility of more than 205 mm/s, wherein the $F_{30}$ melt strength and the $v_{30}$ melt extensibility are determined according to ISO 16790:2005; and 0.05 to 10 wt. %, preferably 1.0 to 8.0 wt. %, more preferably 4.0 to 6.0 wt. %, e.g. from 5.0 to 6.0 wt. %, of the nucleating agent (NA), whereby the recycled polypropylene (R-PP) and/or linear polypropylene (L-PP), the high melt strength polypropylene (HMS-PP) and the nucleating agent (NA) are simultaneously or consecutively combined and mixed in a mixing device.

In step a) the total amount of recycled polypropylene (R-PP) and/or linear polypropylene (L-PP) present in the polypropylene composition is 10.0 to 50.0 wt. %, preferably 15.0 to 40.0 wt. %, more preferably 20.0 to 30.0 wt. %.

The total amount of high melt strength polypropylene (HMS-PP) having an $F_{30}$ melt strength of more than 25.0 cN and a $v_{30}$ melt extensibility of more than 205 mm/s, wherein the $F_{30}$ melt strength and the $v_{30}$ melt extensibility are determined according to ISO 16790:2005 present in the polypropylene composition in step a) is 40.0 to 89.95 wt. %, preferably 57.5 to 84.95 wt. %, more preferably 69.0 to 79.9 wt. %.

The total amount of nucleating agent (NA) present in the polypropylene composition in step a) is 0.05 to 10.0 wt. %, preferably 1.0 to 8.0 wt. %, more preferably 4.0 to 6.0 wt. %, e.g. from 5.0 to 6.0 wt. %.

Further additives (A) as defined herein may optionally be present in step a).

The process preferably further comprises the following step b) subsequent to step a)

b) forming a foamed article comprising the step of foaming the polypropylene composition obtained in step a), preferably the foamed article is a foamed sheet.

More preferably, the process further comprises the following step c) subsequent to step b)

c) forming a cup from the foamed article, preferably the foamed sheet, obtained after step b).

Preferably, the recycled polypropylene (R-PP) polypropylene (L-PP) is a recycled polypropylene (Rec-PP) and the process further comprises the following step d) subsequent to step c), if present, or step b):

d) forming the recycled polypropylene (Rec-PP) using the polymer remains present after step b).

Preferably, an extruder is used for the preparation of the propylene composition, more preferably the extruder comprises in operation direction a feed-throat (FT), a first mixing zone (MZ1), optionally, a second mixing zone (MZ2) and a die (D). Preferably the extruder is a screw extruder, like a twin screw extruder. Accordingly the high melt strength polypropylene (HMS-PP), the nucleating agent (NA), the recycled polypropylene (R-PP) and/or linear polypropylene (L-PP), and, optionally, the additives (A) different from the nucleating agent (NA), if present, are fed via the feed-throat (FT), thereby preferably using a feeder, into the extruder and is/are subsequently passed downstream through the first mixing zone (MZ1). Preferably the shear stress in said first mixing zone (MZ1) is of such extent that the high melt strength polypropylene (HMS-PP) is molten and mixing with the nucleating agent (NA), the recycled polypropylene (R-PP) and/or linear polypropylene (L-PP), and the optional additives (A) different from the nucleating agent (NA), if present, is initiated.

After the first mixing zone (MZ1), the obtained product is passed downstream through the second mixing zone (MZ2), if present. Finally the polypropylene composition is discharged via the die (D).

In case the second mixing zone is present, the first mixing zone (MZ1) is longer than the second mixing zone (MZ2). Preferably the length ratio between the first mixing zone (MZ1) to the second mixing zone (MZ2) [mm (MZ1)/mm (MZ2)] is at least 2/1, more preferably 3/1, yet more preferably in the range of 2/1 to 15/1, still more preferably 3/1 to 10/1.

It is also possible to use the same extruder for the preparation of the high melt strength polypropylene (HMS-PP) and subsequently for step a).

As outlined above, the process preferably further comprises the following step b) subsequent to step a)

b) forming a foamed article comprising the step of foaming the polypropylene composition obtained in step a).

The foaming process is in the skilled knowledge. In such a process, a melt of the instant polypropylene composition comprising a gaseous or liquid foaming agent such as butane, mixtures of butane and propane, HFC or $CO_2$ is suddenly expanded through pressure drop.

Preferably a liquid blowing agent is used, e.g. butane or mixtures of butane and propane. Continuous foaming processes as well as discontinuous process may be applied. In a continuous foaming process, the polypropylene composition is melted and laden with gas in an extruder under pressures typically above 20 bar before being extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004). Processes for foaming are outlined in S. T. Lee, Foam Extrusion, Technomic Publishing (2000). In a discontinuous foaming process, the polypropylene composition (micro-)pellets are laden with foaming agent under pressure and heated below melting temperature before the pressure in the autoclave is suddenly relaxed. The dissolved foaming agent forms bubbles and creates a foam structure. The preparation of discontinuously foamed beads is described for example in DE 3 539 352.

The amount of foaming agent is usually below 10 wt. % based on the total weight of the polymer composition and the foaming agent, preferably below 5 wt. % based on the total weight of the polymer composition and the foaming agent.

Preferred foaming agents are butane and mixtures of butane and propane.

As outlined above, preferably a foamed sheet is formed. Methods for forming foamed sheets are generally known in the art and inter alia described in TW M 463649 which is hereby incorporated by reference in its entirety. Preferably the method and apparatus described in TW M 463649 is used to prepare the foamed sheet according to the present invention.

The article which may be a container, e.g. a bottle, a cup, a can, a canister, a bowl or a trays; a sleeve, e.g. for a container; a lid, e.g. for a container; a film; a blank; a pad; a carrier; a tube; a substrate; a pipe; a vessel; a panel, e.g. a construction panel; a liner, e.g. a truck liner; a tap; a roll or a profile containers, such as according to the present invention are prepared using procedures usual in the art.

The Use

The present invention is furthermore directed to the use of the polypropylene composition according to the present invention for producing foamed sheets fulfilling the following relationship (I)

$$\text{bending resistance (MD)/bending resistance (CD)} \leq 1.2 \quad \text{(I)}$$

wherein

| | |
|---|---|
| bending resistance (MD) | is the bending resistance in machine direction measured according to SCAN P29:95, in mN; and |
| bending resistance (CD) | is the bending resistance in cross direction measured according to SCAN P29:95], in mN. |

The present invention is furthermore directed to the use of the polypropylene composition according to the present invention for producing foamed sheets fulfilling the following relationship (II)

thermal conductivity at 100° C./thermal conductivity at 20° C.≤1.5 (II)

wherein

| | |
|---|---|
| thermal conductivity at 100° C. | is the thermal conductivity of the foamed sheet at 100° C. determined according to ISO 1856:2000 in m · K; and |
| thermal conductivity at 20° C. | is the thermal conductivity of the foamed sheet at 20° C. determined according to ISO 1856:2000 in m · K. |

Preferably, the present invention is directed to the use of the polypropylene composition according to the present invention for producing foamed sheets fulfilling relationships (I) and (II) as outlined above.

Preferred features of the polypropylene composition, foamed sheet, article and process of the present invention are also preferred features for the uses according to the present invention

EXAMPLES

A. Measuring Methods

The following definitions of terms and determination methods apply for the above general description of the invention as well as to the below examples unless otherwise defined.

MFR

The MFR of the polypropylenes has been determined according to ISO 1133 under a load of 2.16 kg and at a temperature of 230° C.

Density of the Polymer

The Density was measured according to ISO 1183-1—method A (2004). Sample preparation is done by compression moulding in accordance with ISO 1872-2:2007.

Comonomer Content in Polypropylene

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

Melting temperature ($T_m$) and heat of fusion ($H_f$), crystallization temperature ($T_c$) and heat of crystallization ($H_c$): The melting temperature $T_m$ and crystallisation temperature $T_c$ were measured with a TA Instruments Q2000 differential scanning calorimetry device (DSC) according to ISO 11357/3 on 5 to 10 mg samples. Crystallisation and melting temperatures were obtained in a heat/cool/heat cycle with a scan rate of 10° C./min between 30° C. and 225° C. Melting and crystallisation temperatures were taken as the peaks of the endotherms and exotherms in the cooling cycle and the second heating cycle respectively.

$MFR_2$ (230° C.) is measured according to ISO 1133 (230° C., 2.16 kg load).

$F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Gottfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sect. The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Gel Content

About 2 g of the polymer ($m_p$) are weighted and put in a mesh of metal which is weighted ($m_{p+m}$). The polymer in the mesh is extracted in a soxhlet apparatus with boiling xylene for 5 hours. The eluent is then replaced by fresh xylene and the boiling is continued for another hour. Subsequently, the mesh is dried and weighted again ($m_{XHU+m}$). The mass of the xylene hot unsolubles ($m_{XHU}$) obtained by the formula $m_{XHU+m}-m_m=m_{XHU}$ is put in relation to the weight of the polymer ($m_p$) to obtain the fraction of xylene insolubles $m_{XHU}/m_p$.

Particle Size/Particle Size Distribution of the Polymer

A gradation test was performed on the polymer samples. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve.

Particle Size of the Nucleating Agent

The median particle size $d_{50}$ is calculated from the particle size distribution [mass percent] as determined by gravitational liquid sedimentation according to ISO 13317-3 using a Sedigraph 5100 (Micromeritics Corporation).

Density of the Foam

This has been measured using an analytical and semi-micro precision balance of Switzerland PRECISA Gravimetrics AG, Switzerland, the specific gravity balance (XS225A); test method: application of Archimedes, automatically calculate the density of the sample.

Cell Size Diameter of the Foam

The cell size diameter of the foam was determined using a light optical microscope of Taiwan CBS Stereoscopic microscope;

The testing method used is as follows:

1. Cut a strip of the foamed material along the cross direction (CD) and machine direction (MD).
2. Hold the foamed material with a flat clamp and use a razor blade to perform a fine shave.
3. Focus the microscope at 100× and adjust lighting onto the foamed material.
4. Perform length and width measurements of each unique cell in the CD and MD orientation and record values.
5. Count the number of measured unique cells and record the values.
6. Perform cell wall thickness measurements across 3-4 tangent lines to overall length of each unique cell in the CD and MD orientation and record the values.
7. Perform three overall strip thickness measurements starting from the bottom of the first measured cell group, to the middle of the cell group, to the top of the cell group.
8. Perform an overall length measurement starting from the lowest complete cell to the highest complete cell.
9. Move microscope visual field so the bottom of the most upper incomplete cell is touching the bottom of the screen.
10. Repeat steps 4-9 on each new unique cell until about 0.200" to 0.800" of the strip is measured. Ensure that the overall length and cell composition does not overlap. Each overall length measurement after the first measurement is taken from the top of the previous highest complete cell to the top of the current highest complete cell.

Surface Roughness of the Foam

This has been measured using the portable surface roughness tester, model SJ-310 of Mitutoyo, Japan. The surface roughness tester (also known as a profilometer) is a contact surface roughness tester. The roughness determination is fully automated and runs via the included software.

Bending Resistance

The bending resistances in machine and cross direction were determined according to the method SCAN P29:95 issued by the Scandinavian pulp, paper and board Testing committee.

Thermal Conductivity

The thermal conductivities of the foamed sheet at 20° C. and at 100° C. were determined according to ISO 1856: 2000.

Inventive Example 1 (IE1)

Preparation of a Foamed Sheet 1. dry-blending of 750 kg of Daploy™ WB140HMS ($MFR_2$ (230° C.) measured according to ISO 1133 of 2.1 g/10 min; $F_{30}$ melt strength, determined according to ISO 16790:2005 of 36 cN; $v_{30}$ melt extensibility, determined according to ISO 16790:2005 of 230 mm/s of Borealis AG (HMS-PP), 248 kg of recycled polypropylene ($MFR_2$ (230° C.) measured according to ISO 1133 of 5.8 g/10 min; $F_{30}$ melt strength, determined according to ISO 16790:2005 of 16.9 cN; $v_{30}$ melt extensibility, determined according to ISO 16790:2005 of 270 mm/s) which is obtained by recycling the foamed sheet prepared in a previous production process performed as the present process and 2 kg of talc;
2. feeding the blend obtained in the $1^{st}$ step into a $1^{st}$ single screw extruder of Pitac Taiwan (screw diameter 90 mm; L/D ratio 26). The extruder is operated at a temperature of 200° C. (5 heating zones: 150° C.; 200° C.; 200° C.; 200° C.; 200° C.) so as to melt the polymer;
3. injecting of 3 wt % liquid butane (as blowing agent), based on the total weight of the blend, in the last section of the $1^{st}$ single screw extruder obtaining thereby a molten blend;
4. passing the molten blend through a $2^{nd}$ single screw extruder of Pitac Taiwan (screw diameter 120 mm; L/D ratio 34) thereby cooling down the molten blend to 160° C. at the end of the $2^{nd}$ single screw extruder;
5. passing the molten blend of the $4^{th}$ step through an extruding die placed at the end of the $2^{nd}$ extruder; when exiting the extruder the molten blend is exposed to a pressure drop into atmospheric pressure by the sudden pressure drop the blowing agent in the molten blend expands and thereby accomplishes foaming resulting in a foamed structure; subsequently the foamed structure is cooled at cooling-drums with temperature below 100° C. thereby obtaining a foam sheet having a density of 200 $kg/m^3$ and a thickness of 0.8 mm;
6. thereafter the foam sheet and a 20 μm thick BOPP film are passed through an in-line extruding laminating unit of YC Group Taiwan to laminate the foamed sheet on the BOPP film obtaining thereby a 2 layer sheet.

Inventive Example 2 (IE2)

The procedure of inventive example 1 was repeated except that the thickness of the foamed sheet in step 5 was 1.0 mm.

Comparative Example 1 (CE1)

Cupforma Natura™ PE from Stora Enso (Standard LDPE laminated carton cup)

The results of the inventive examples IE1 and IE2 as well as of the comparative example CE1 are set out in the following table 1.

TABLE 1 results of the inventive and comparative examples

| | | IE1 | IE2 | CE1 |
|---|---|---|---|---|
| Sheet thickness | mm | 0.8 | 1.0 | 0.4 |
| Foam density | kg/m3 | 200 | 200 | — |
| Sheet grammage | g/m2 | 230 | 260 | 275 |
| Thickness of LDPE coating | μm | — | — | 10 |
| Thickness of BOPP coating | μm | 25 | 25 | — |
| machine direction (MD) | mN | 200 | 270 | 290 |
| cross direction (CD) | mN | 190 | 340 | 130 |

TABLE 1-continued results of the inventive and comparative examples

| | | IE1 | IE2 | CE1 |
|---|---|---|---|---|
| Surface roughness foam side | μm | 4.7 | 4.3 | n.m |
| Surface roughness BOPP side | μm | 1.2 | 1.63 | n.m |
| Thermal conductivity at 20° C. | W/(m · K) | 0.032 | 0.036 | 0.072 |
| Thermal conductivity at 100° C. | W/(m · K) | 0.036 | 0.036 | 0.122 |

As can be seen from the above, the inventive composition leads to foamed sheets with balanced bending resistance in machine direction and cross direction enables simplified cup production as blanks can be used in every direction. Moreover, the foamed sheets have excellent thermal insulation properties which are not temperature dependent.

The produced sheet were used in cup production after cutting using standard paper cup machine (Eagle 1000S ACE Pack Korea) with a heating element modification in order to form the cup rim.

The invention claimed is:

1. A polypropylene composition comprising:

20.0 to 30.0 wt. % of recycled polypropylene (R-PP);

69.0 to 79.9 wt. % of a high melt strength polypropylene (HMS-PP) having an $F_{30}$ melt strength of 25.0 cN to 40.0 cN and a $v_{30}$ melt extensibility of 225 to 260 mm/s, wherein the $F_{30}$ melt strength and the $v_{30}$ melt extensibility are determined according to ISO 16790:2005; and 0.05 to 6.0 wt. % of a nucleating agent (NA);

wherein the recycled polypropylene (R-PP) has an $F_{30}$ melt strength of 1.0 to 20.0 cN, determined according to ISO 16790:2005, and a melt flow rate $MFR_2$ (230° C.) measured according to ISO 1133 in a range of 5 to 15 g/10 min; and wherein the nucleating agent (NA) is talc.

2. The polypropylene composition according to claim 1, wherein the recycled polypropylene (R-PP) is a recycled polypropylene (Rec-PP) comprising at least 50 wt. % of recycled high melt strength polypropylene (HMS-PP).

3. A foamed sheet formed from the polypropylene composition according to claim 1.

4. The foamed sheet according to claim 3, having a thickness of 0.5 to 10 mm and/or a density of 150 to 250 $kg/m^3$.

5. The foamed sheet according to claim 3, wherein the foamed sheet is covered by a cover layer (CL).

6. The foamed sheet according to claim 5, wherein the foamed sheet and the cover layer (CL) are directly adjacent.

7. An article comprising the foamed sheet according to claim 3.

8. A process comprising the following step a) producing a polypropylene composition comprising 20.0 to 30.0 wt. % of recycled polypropylene (R-PP);

69.0 to 79.9 wt. % of a high melt strength polypropylene (HMS-PP) having an $F_{30}$ melt strength of 25.0 cN to 40.0 cN and a $v_{30}$ melt extensibility of 225 to 260 mm/s, wherein the $F_{30}$ melt strength and the $v_{30}$ melt extensibility are determined according to ISO 16790:2005; and 0.05 to 6.0 wt. % of a nucleating agent (NA), wherein the recycled polypropylene (R-PP) has an $F_{30}$ melt strength of 1.0 to 20.0 cN, determined according to ISO 16790:2005, and a melt flow rate $MFR_2$ (230° C.) measured according to ISO 1133 in a range of 5 to 15 g/10 min; and wherein the nucleating agent (NA) is talc;

whereby the recycled polypropylene (R-PP), the high melt strength polypropylene (HMS-PP) and the nucleating agent (NA) are simultaneously or consecutively combined and mixed in a mixing device.

9. The process according to claim 8, wherein the process further comprises the following step b) subsequent to step a)

b) forming a foamed article comprising the step of foaming the polypropylene composition obtained in step a).

10. The process according to claim 9, wherein the process further comprises the following step c) subsequent to step b)

c) forming a cup from the foamed article obtained after step b).

11. The process according to claim 9, wherein the recycled polypropylene (R-PP) is a recycled polypropylene (Rec-PP) and the process further comprises the following step d) subsequent to step b):

d) forming the recycled polypropylene (Rec-PP) using polymer remains present after step b).

12. A method comprising producing foamed sheets from the polypropylene composition according to claim 1, the foamed sheets fulfilling the following relationship (I):

$$\text{bending resistance (MD)/bending resistance (CD)} \leq 1.2 \quad \text{(I)}$$

wherein bending resistance (MD) is the bending resistance in machine direction measured according to SCAN P29:95, in mN; and bending resistance (CD) is the bending resistance in cross direction measured according to SCAN P29:95, in mN.

13. A method comprising producing foamed sheets from the polypropylene composition according to claim 1, the foamed sheets fulfilling the following relationship (II)

$$\text{thermal conductivity at 100° C./thermal conductivity at 20° C. 1.5} \quad \text{(II)}$$

wherein thermal conductivity at 100° C. is the thermal conductivity of the foamed sheet at 100° C. determined according to ISO 1856:2000 in m·K; and thermal conductivity at 20° C. is the thermal conductivity of the foamed sheet at 20° C. determined according to ISO 1856:2000 in m·K.

* * * * *